United States Patent [19]

Geyer, Jr. et al.

[11] Patent Number: 4,612,549
[45] Date of Patent: Sep. 16, 1986

[54] INTERFERENCE CANCELLER LOOP HAVING AUTOMATIC NULLING OF THE LOOP PHASE SHIFT FOR USE IN A RECEPTION SYSTEM

[75] Inventors: Bernard H. Geyer, Jr., Liverpool; Donald W. Perkins, Dewitt, both of N.Y.

[73] Assignee: General Electric Company, Syracuse, N.Y.

[21] Appl. No.: 565,110

[22] Filed: Dec. 23, 1983

[51] Int. Cl.⁴ .................. G01S 3/16; G01S 3/28
[52] U.S. Cl. .................. 343/379; 343/380; 343/382; 343/383
[58] Field of Search .............. 343/379, 380, 381, 382, 343/383, 384

[56] References Cited

U.S. PATENT DOCUMENTS

| | | | |
|---|---|---|---|
| 3,517,323 | 6/1970 | Rudin, Jr. | 328/155 |
| 3,621,406 | 11/1971 | Paine | 328/155 |
| 3,739,103 | 6/1973 | Hess | 178/69.5 |
| 3,768,022 | 10/1973 | Lang | 328/155 |
| 4,070,675 | 1/1978 | Daniel et al. | 343/380 |
| 4,156,851 | 5/1979 | Winters | 328/155 |
| 4,280,128 | 7/1981 | Masak | 343/380 |
| 4,295,098 | 10/1981 | Crowley | 328/24 |
| 4,298,873 | 11/1981 | Roberts | 343/375 |
| 4,301,415 | 11/1981 | McFayden | 328/24 |
| 4,313,116 | 1/1982 | Powell et al. | 343/380 |
| 4,398,161 | 8/1983 | Lamb et al. | 333/156 |
| 4,417,249 | 11/1983 | Zscheile, Jr. | 343/379 |
| 4,467,326 | 8/1984 | Charas et al. | 343/379 X |
| 4,554,548 | 11/1985 | Brilman et al. | 343/379 |

OTHER PUBLICATIONS

Analog Devices Digital-to-Analog Converters/vol. 1, 10–139.

Primary Examiner—Theodore M. Blum
Assistant Examiner—John B. Sotomayor
Attorney, Agent, or Firm—Richard V. Lang; Carl W. Baker

[57] ABSTRACT

The present invention relates to a reception system for radar and communications systems in which interference cancellation takes place in a correlation loop. In the present invention, automatic means are provided for digitally adjusting the phase shift around the correlation loop to insure loop stability and optimum interference cancellation.

5 Claims, 5 Drawing Figures

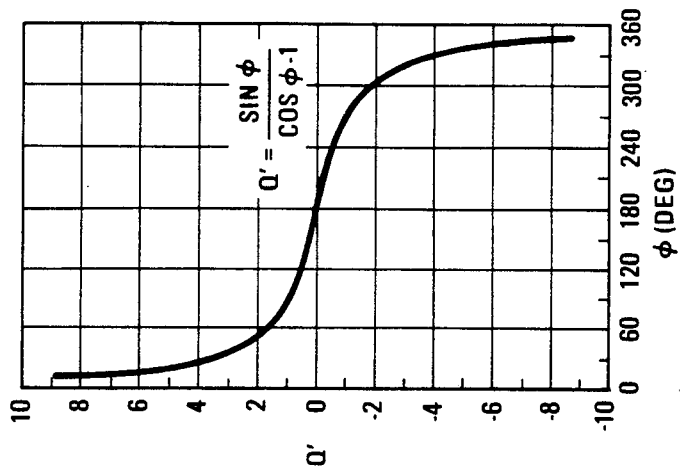

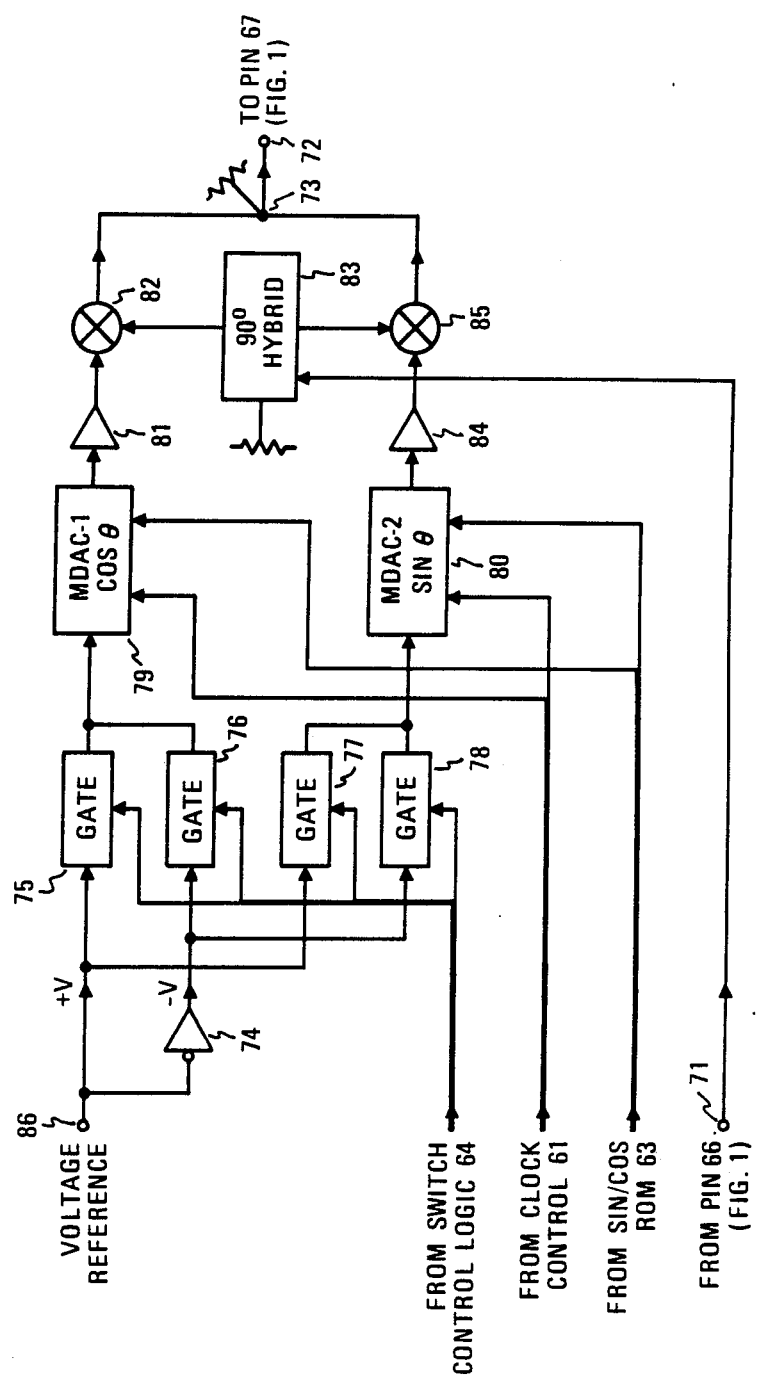

INTERFERENCE CANCELLER LOOP HAVING AUTOMATIC NULLING OF THE LOOP PHASE SHIFT FOR USE IN A RECEPTION SYSTEM

BACKGROUND OF THE INVENTION

1. Field of the Invention

The present invention relates to reception systems for radar and for radio communications in which interference cancellation takes place in a correlation loop. More particularly, the invention relates to means for nulling the phase shift in such correlation cancellation loops.

2. Description of the Prior Art

On radar systems, as well as in many communications systems, a highly directional main antenna is provided for receiving information. All such directional antennas have minor lobes to either side of the main lobe. The interference received via the side lobes may interfere with the desired signal impinging on the main lobe. Devices which attack this problem have been termed "side lobe cancellers". Known "side lobe cancellers" have taken the form of adaptive signal processors in which interference is derived in less directional antennae separate from the directional main antenna. The interference is then reconstructed by correlation techniques in such a way that when subtracted from the main return, the interference is cancelled.

The interference, while dealt with in general terms, may take the form of a jamming signal in a radar system; or, in a communications system, a signal from a nearby source. Such side lobe cancellers have in common, a cancellation summer in which interference present in the main antenna return is cancelled with that in the auxiliary antenna. Prior to the cancellation, however, correlation is undertaken between the interference in the auxiliary antenna and that in the main antenna return, resulting ideally in a complex low frequency or d.c. quantity, the "correlation" representing the relative magnitude and phase relationships of the two signals. This "correlation" can then be used as a complex "weight", which when multiplied by the interference in the auxiliary signal, will cause a more nearly ideal cancellation.

A common requirement in all such systems is that the feedback loop must operate with high stability. A well known requirement in such loops is that the phase shift around the loop be 180°.

Accordingly, it has been proposed to inject a signal into the main and auxiliary channel to "activate" the side lobe canceller loop, and then interrupt the loop to sense a 180° phase shift, while the phase shift around the loop is being manually adjusted. In general, the manual adjustment is complicated by the need for relatively highly skilled personnel to effect the adjustment, and is a relatively complex procedure.

SUMMARY OF THE INVENTION

Accordingly, it is an object of the present invention to provide an improved means for nulling the phase shift in a side lobe canceller.

It is another object to provide means for automatically nulling the phase shift in a side lobe canceller.

It is still another object to provide digital means for automatically nulling the phase shift in a side lobe canceller.

These and other objects of the invention are achieved in an interference loop in a reception system having a main directional antenna and an auxiliary, less directional antenna. The loop comprises a cancellation summer, a correlation mixer, a phase adjusting adaptive weight processor, a weighting multiplier, and a digital phase error control network.

The main return containing interference and a weighted auxiliary signal containing interference are coupled to the summer, whose output provides the main signal and an interference residue. A part of the summer output containing the interference residue and auxiliary signal containing interference are coupled to the correlation mixer, whose output provides a first complex correlation vector (modulated on a carrier) and suitable for use as a complex weight for interference cancellation.

The phase adjusting adaptive weight processor comprises a stable oscillator having a frequency equal to the correlation carrier and producing two quadraturely related components; digitally adjustable phase shifting means comprising a pair of synchronous demodulators coupled to the correlation mixer and oscillator to derive two quadrature related correlation vector coordinates at base band, digitally phase shifted by an angle $\theta$. The processor is completed by a first and a second modulator also coupled to the stable oscillator to modulate the phase shifted correlation coordinates, respectively, on the first and second of two quadrature related components of the carrier, and means to combine the modulated carriers to form a second correlation vector, phase shifted by the angle $\theta$ in respect to the first correlation vector, and modulated on the carrier.

The carrier-borne second correlation vector and the auxiliary signal containing interference are coupled to the weighting multiplier, whose product is coupled to the cancellation summer closing the correlation loop.

The digital phase error control network is coupled to the correlation vector phase shifting means for adjusting the angle $\theta$. The carrier borne second correlation vector and the auxiliary signal containing interference are coupled to the weighting multiplier, whose product is coupled to the cancellation summer. The digital phase error control network is coupled to the correlation vector phase shifting means for adjusting the angle $\theta$. It includes means to apply an auxiliary test signal, as virtual interference for loop phase adjustment, on a carrier to the first input of the cancellation summer, the second input of the correlation mixer, and the second input of the weighting multiplier, to activate the correlation loop. In addition, the control network includes means to decouple one correlation component (e.g. I) at base band in the adaptive weight processor prior to application to the first modulator, and to substitute a reference value for the decoupled component; means coupled to the input to the second modulator to derive an error quantity corresponding to the other correlation component (e.g. Q) at base band resulting from application of the reference value after the correlation loop has stabilized, the error quantity approaching zero at a correlation cancellation loop phase shift of approximately 180°; and means responsive to the error quantity to digitally command phase shift of the base band correlation coordinates to the angle $\theta$, at which the error quantity is nulled and said loop phase shift is approximately 180°.

The foregoing configuration produces an error quantity (Q') which is substantially as follows:

$$Q' = \frac{\sin \phi}{\cos \phi - 1}$$

where $\phi$ is the loop phase shift, which has a single null at $\phi = 180°$.

The correlation vector phase shifting means comprises a coordinate rotation matrix operating on the correlation coordinates (I, Q) after demodulation to base band, where $$I = M \cos \alpha$$

$$Q = M \sin \alpha$$

where $\alpha$ is the phase shift and M is the magnitude of the correlation vector in traversing the correlation loop, the matrix including means to multiply said I and Q correlation coordinates by stored digital trigonometric quantities in quadrant dictated polarities to obtain the correlation coordinates (I' and Q'), phase shifted by the angle $\theta$, where $$I' = I \cos \theta - Q \sin \theta = M \cos (\alpha + \theta)$$

$$Q' = I \sin \theta + Q \cos \theta = M \sin (\alpha + \theta)$$

the angle $\theta$ being adjusted by said error control network until $(\alpha + \theta) = 180°$.

In a second embodiment of the invention, rotation of the phase of the correlation vector is achieved by means of a digitally controlled phase rotation matrix operating on the quadrature related components of the oscillator feeding the modulators. Quadrature components of the oscillator waveform are separately rotated, and then recombined to form a phase shifted oscillator waveform, which is then applied in quadrature to the demodulators. The phase error control network produces a null when the rotation of the oscillator waveform is such that the correlation coordinates per se have experienced the desired loop phase shift of 180°.

BRIEF DESCRIPTION OF THE DRAWINGS

The novel and distinctive features of the invention are set forth in the claims appended to the present application. The invention itself, however, together with further objects and advantages thereof, may best be understood by reference to the following description and accompanying drawings, described below.

FIG. 3 is a chart illustrating the control of signs of the trigonometric quantities employed in a repeating, 360° coordinate rotation;

FIG. 4 is a graph of the error quantity used to provide an unambiguous convergence of the phase correction to the desired 180° phase shift around the canceller loop; and FIG. 5 is an illustration of a novel phase adjusting portion of an adaptive weight processor in accordance with a second embodiment of the invention, providing a digitally controlled phase shift around the canceller loop, by a phase shift of the oscillator waveform used in synchronous quadrature demodulation of the correlation line, the second embodiment using a phase error control network for sensing the phase error and commanding the phase shift similar to that of the first embodiment.

DESCRIPTION OF THE PREFERRED EMBODIMENT

The description that follows pertains to a radar application but the invention is equally applicable to a communications system using a directional receiving system.

Figure 1:
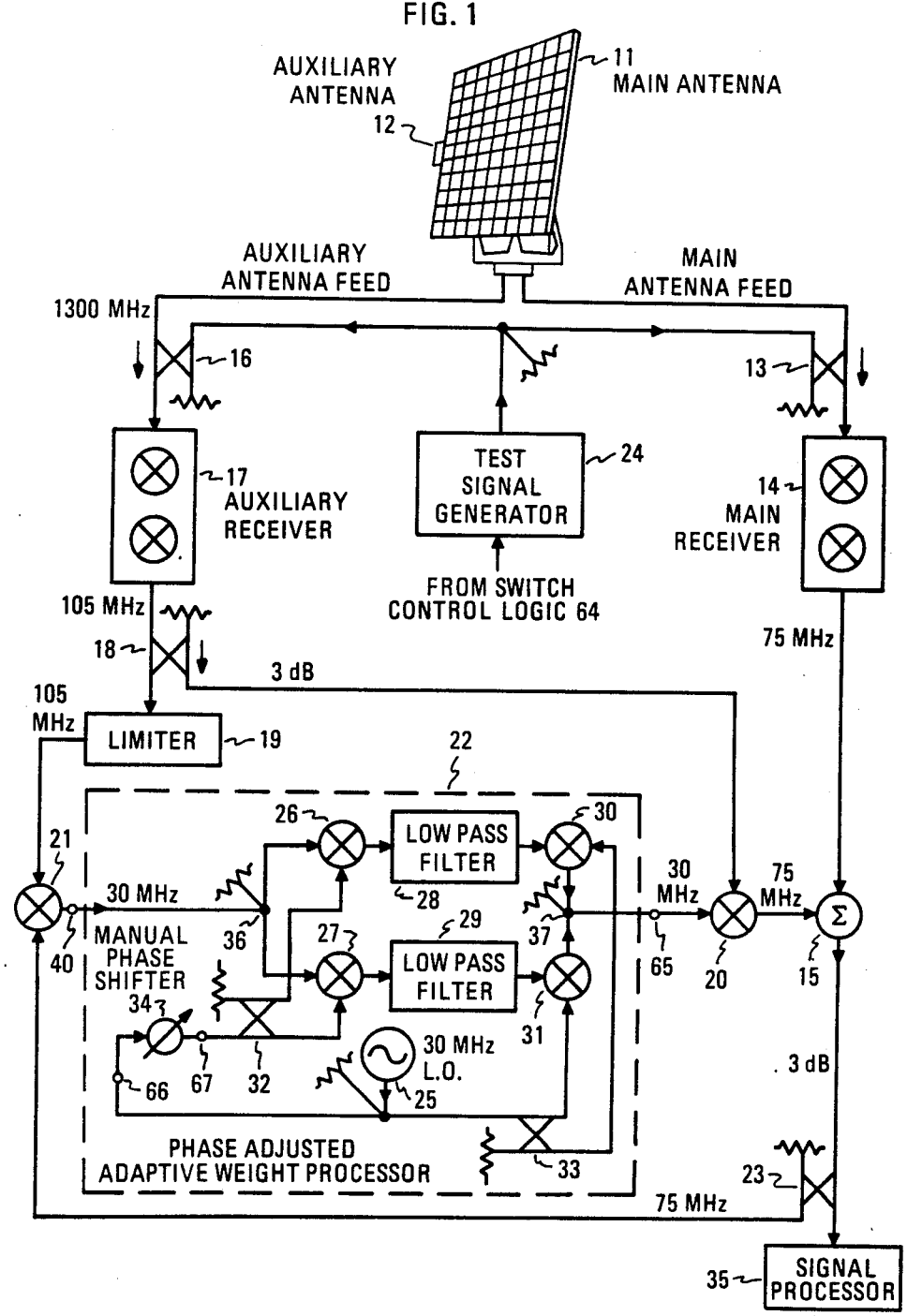
FIG. 1 is an illustration of the reception portion of a radar system incorporating a side lobe canceller including in the adaptive weight processor, which is a part thereof, a known manually operated phase adjustment means to achieve the desired 180° phase shift around the correlation loop to insure loop stability and optimum cancellation.

A simplified diagram of a sidelobe canceller, in which the present invention has application, is illustrated in FIG. 1. The side lobe canceller is in turn a part of the reception portion of a radar system. The reception portion includes a directional main antenna 11, which is used for both transmitting and receiving, the transmitter not being illustrated, and a less directional auxiliary antenna 12. Frequently, when the main antenna is an array of a large number of elements, the auxiliary antenna consists of a few elements adjoining the array. This disposition brings the two antennas into close physical proximity and fixes their spatial relationship for more effective "side lobe" cancellation.

A side lobe canceller is an arrangement for eliminating interference, typically attributable to the receptivity of the side lobes of a radar antenna to broadband jamming. The main antenna has a directional pattern having a forward projecting main lobe typically of a few degrees (e.g. 1½ degrees) in cross section, and side lobes typically extending 60° to 90° to either side of the main lobe at a reduced level (e.g. 20-50 db) in relation to the main lobe. When a target lies within the angular coverage of the main lobe of the radar antenna, the return received by the main antenna and coupled to the main receiver will be of maximum intensity. Due to the double path travelled from transmitter to target to receiver, the actual target return will be attenuated as a fourth power of the target distance. Jamming is visualized as being due to a small number of relatively low power wide band transmitters of uncertain proximity to and at arbitrary angles with respect to the antenna orientation. The jamming will not ordinarily lie within the angular coverage of the narrow main lobe of the antenna, which is directed to the target, but rather within the angular coverage of the side lobes. Due to the single path of travel, the jamming arrives attenuated as a second power of the distance to the antenna from the jammer. Thus, the intensity of the interference from the side lobe as measured in the main radar receiver output may be comparable to the intensity of the signal from the main lobe as measured in the main radar receiver output. Thus, the jamming may mask a target return and interfere with target location by the radar system. In a typical side lobe canceller, the auxiliary antenna provides coverage of the side lobes of the main antenna for unattenuated reception of the jamming signal as a first step in its elimination.

The interference produced by a jammer may be substantially reduced in the system so far described by a correlation cancellation process. Cancellation of the interference appearing at the output of the main antenna (11) may be achieved in a feedback loop by cross-correlating the main antenna output (containing both target information and interference) with the interference sample received by the auxiliary antenna. The correlation value thus determined is a complex variable called a "weight". The "weight" is then multiplied by the interference waveform received by the auxiliary antenna to adjust the interference waveform in aplitude and phase. A properly correlated adjustment brings the interference derived from the auxiliary antenna into approximate equality in magnitude and 180° phase opposition to that derived from the main antenna, permitting addition to substantially cancel the interference from the output of the main antenna. This cancellation process has been termed "side lobe cancellation", since it may be regarded as producing a null in the side lobe of the antenna oriented toward the jammer. This terminology also reflects the observation that the electrical energy introduced for cancellation may not only create the desired null in a pre-existing side lobe but may effect a virtual redistribution of adjoining side lobes in the electrical output of the antenna.

Figure 2:
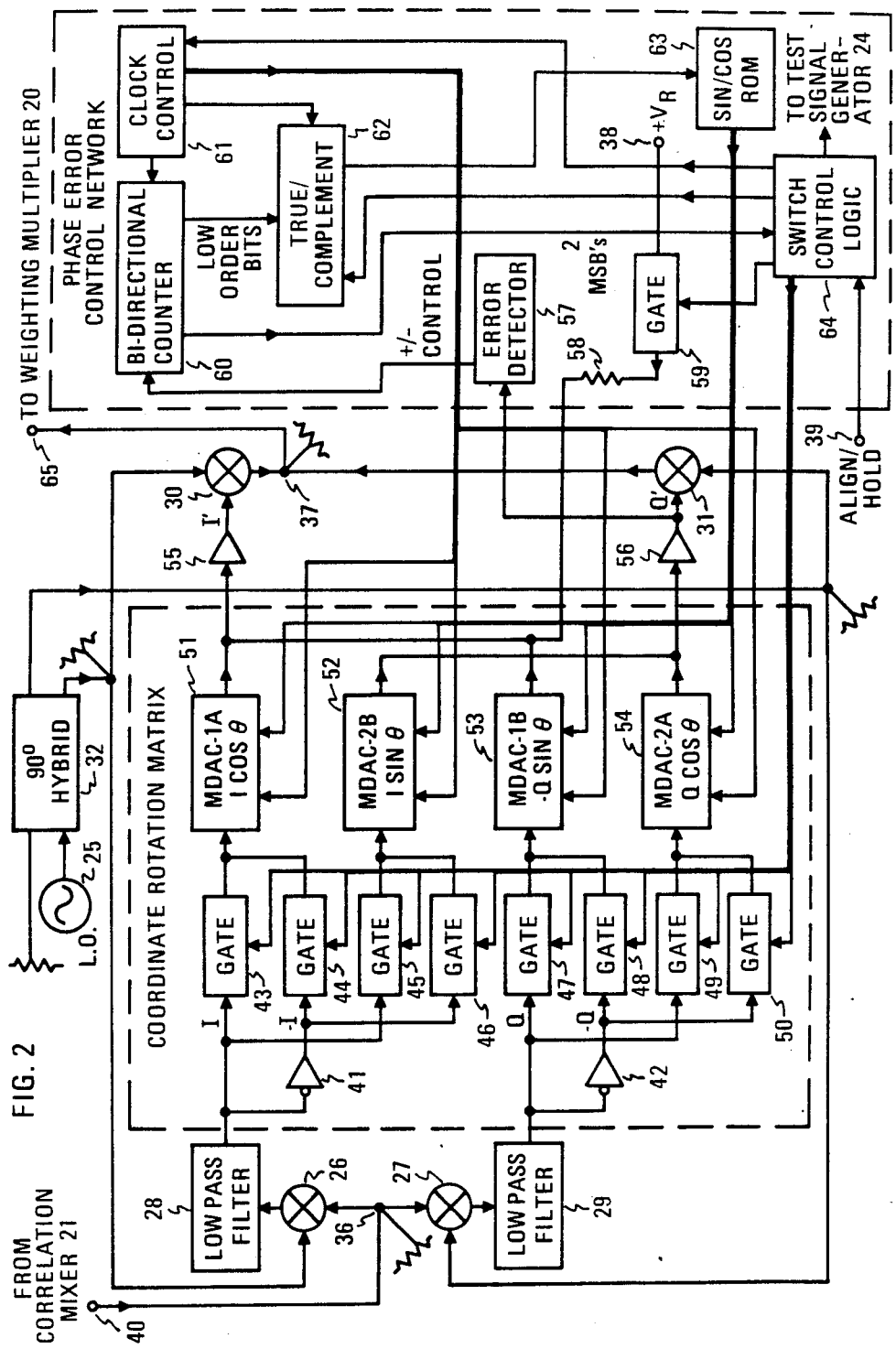
FIG. 2 is an illustration of a novel phase adjusting adaptive weight processor in accordance with a first embodiment of the invention, suitable for substitution into the FIG. 1 arrangement, and providing a digitally controlled phase shift around the the canceller loop by rotation of the separate coordinates of the correlation line at base band in a coordinate rotation matrix.

Optimal performance of the correlation canceller system relies on the fact that it contains a feedback loop, which continuously adjusts the cancellation weights. The elements of a known side lobe canceller functioning in this manner are depicted in FIG. 1. The inventive contribution, which is illustrated in FIG. 2, lies in improved means for eliminating phase errors occurring within the feedback loop, which reduce the quality of cancellation.

Referring now to FIG. 1, the output of the main antenna 11 at microwave frequencies (e.g. 1300 MHz) is coupled via a first test signal injection coupler 13 to a main receiver 14. The output of the auxiliary antenna 12 is coupled via a second test signal injection coupler 16 to the auxiliary receiver 17. As will be seen, the test signal generator 24 and the test signal injection couplers 13 and 16 are portions of a phase correction circuit for the side lobe canceller loop. These elements (13, 16, 24) and others that will be introduced are designed to permit correction of the phase shift around the correlation loop for optimum cancellation during a no signal or test condition. More particularly, they are designed to compensate for arbitrary phase shifts in the correlation loop, particularly due to changes in the equipment over time or temperature or parts changes during repairs, etc. The test signal injection couplers 13 and 16 each have one port coupled via a suitably branched transmission path to a test signal generator 24 which functions during phase adjustment of the side lobe canceller loop and is normally inactive during routine operation of the radar system.

Using the orientations of FIG. 1 and dealing initially with coupler 13, it may be assumed that a signal applied from the main antenna 11 to the upper right port of coupler 13 will be coupled primarily to the lower right port leading to the main receiver 14. At the same time, a small portion of the signal derived from the main antenna, typically attenuated 20 db, will be coupled to the lower left port and absorbed in the dummy load termination illustrated for that port. Essentially no signal derived from the main antenna will be coupled to the upper left port. On the other hand, a signal applied to the upper left port of the coupler 13 from the signal test generator 24 will be coupled to the dummy load at the lower left port and only a small portion, typically attenuated 20 db, will be coupled via the lower right port to the main receiver 14. A substantial amount of attenuation of the test signal poses no particular problem in view of the high receiver gain which follows. Essentially no signal from the test generator 24 will be coupled to the upper right port leading to the main antenna 11.

The coupler 16 functions similarly to the coupler 13. The signal applied from the auxiliary antenna 12 to the upper left port of coupler 16 will be coupled primarily to the lower left port leading to the auxiliary receiver 17. At the same time, a small portion of the signal derived from the auxiliary antenna, typically attenuated 20 db, will be coupled to the lower right port and absorbed in the dummy load termination provided at that port. Essentially no signal derived from the auxiliary antenna will be coupled to the upper right port. Similarly, a signal applied to the upper right port of the coupler 16 from the test signal generator 24 will be coupled to the dummy load at the lower right port and only a small portion, typically attenuated 20 db, will be coupled to the auxiliary receiver 17. This amount of attenuation of the test signal poses no particular problem in view of the high gain which follows. Essentially no signal from the test generator 24 will be coupled to the upper left port of the coupler 13 leading to the auxiliary antenna 12.

The main receiver 14, to which the main antenna 11 is coupled, converts the radar signal and any interference through a double conversion process to a suitable first intermediate frequency (e.g. 75 MHz) permitting efficient amplification and filtering with uniform phase response. Typically, the radar signal is several megahertz in bandwidth (e.g. 15 MHz). The output from the main receiver 14 is then coupled to one input of the cancellation summer 15 in which interference cancellation takes place.

The auxiliary receiver 17, to which the auxiliary antenna 12 is coupled, converts the interference, through a double conversion process, to a suitable second IF frequency (e.g. 105 MHz).

The remaining elements 15 and 18–23, of FIG. 1, complete the side lobe canceller loop. These elements include a 3 db coupler 18, a limiter 19, a correlation mixer 21, a phase adjusted adaptive weight processor 22 (which in turn comprises a plurality of components), a weighting multiplier 20, a 3 db coupler 23, and finally, the cancellation summer 15. The foregoing elements utilize the output of the main receiver 14 (containing the radar signal and interference), and the output of the auxiliary receiver 17 (containing the interference) and produce at the output of the cancellation summer 15 a signal in which the interference is cancelled.

The elements (15 and 18–23) taking part in interference cancellation are interconnected as follows. The auxiliary receiver (17) output at the second IF frequency (105 MHz), which contains interference, is divided by means of the 3 db coupler 18 between the limiter 19 and one input of the weighting multiplier 20. The limiter (19) output, which contains interference, is coupled to one input of the correlation mixer 21. The other input of the correlation mixer 21 is a 75 MHz signal derived via the coupler 23 from the output of the cancellation summer 15. The "residual" signal from the summer (15) output, after loop stabilization, contains the radar target return and the interference diminished by the cancellation process. The correlation mixer 21 forms from its two input signals of 105 MHz and 75

MHz, respectively, an output signal of 30 MHz, which is coupled via terminal 40 to the input of the phase adjusted adaptive weight processor 22.

The correlation mixer 20, sensing the point to point similarity between the interference coupled to one mixer input and the interference coupled to the other mixer input, produces a correlation "line" which is ideally a vector modulated on the newly formed 30 MHz IF carrier. The correlation line provides information as to the relative phase and amplitude of the correlated inputs, that may be used to process one input to the summer (15) to bring that input into magnitude correspondence and phase opposition to the other input. More particularly, the correlation "line" represents the values of a "weight", later used in a weighting multiplier 20 to modify the phase and amplitude of the interference obtained from the auxiliary receiver 17 preliminary to interference cancellation. The correlation signal, which lies within a narrow band (a few KHz) is accompanied by correlation noise, which is wide band (many MHz), and which includes the uncorrelated products of the correlation process.

The processor 22, deriving the correlation line from the correlation mixer 21, produces the "weight" by which the interference is multiplied and filters out the correlation noise. The phase adjusted adaptive weight processor 22 includes a local oscillator 25, a pair of synchronous demodulators 26, 27, low pass filters 28, 29, a pair of modulators 30, 31, a pair of directional couplers 32, 33, a pair of 180° hybrid junctions 36 and 37 for power division and power combination, respectively, and a manual phase shifter 34.

The weight appearing in the output of the adaptive weight processor 22 is coupled via terminal 65 to a second input of the weighting multiplier 20. The weighting multiplier 20 multiplies the interference signal from auxiliary receiver 17 with the "weight" (modulated on the 30 MHz local oscillator 25) derived from the adaptive weight processor 22. The weighted output from the weighting multiplier 20 is then coupled to the second input of the cancellation summer 15. Since the output from the main antenna is coupled to the first input of the cancellation summer, and assuming equal magnitudes and 180° phase opposition, a subtraction results at the output of the cancellation summer 15. The "residual signal" at the output of the summer 15 is divided by means of the 3 db coupler 23. One part of the summer output is coupled to one input of the correlation mixer 21 to close the correlation cancellation loop. The other part of the summer output is coupled to the signal processor 35 for signal utilization.

Assuming that the side lobe canceller loop is closed and functioning properly, the product of the multiplier 20 is a "weighted" interference output approximating the magnitude of and in phase opposition to the interference signal as it appears at the output of the main receiver 14. The output of the summer 15 accordingly contains the radar target returns, and interference diminished by the cancellation process. In a practical application, the interference reduction may be 20 to 30 db.

The phase adjusted adaptive weight processor 22, as illustrated in FIG. 1, is a known configuration. The external connections to the processor and the connections between the elements of the processor are as follows. The output from the correlation mixer 21 which includes the correlation line and wide band correlation noise on a 30 MHz IF carrier, is coupled via the input terminal 40 to the power dividing hybrid junction 36 to one input of each of the synchronous demodulators 26, 27. The other input of the demodulator 26 is serially coupled via the directional coupler 32 and the manual phase shifter 34 to a local oscillator 25 at a 30 MHz frequency. The other input of demodulator 27 is serially coupled via the directional coupler 32 and the manual phase shifter 34 to the local oscillator 25. The directional coupler 32, which is interposed between the local oscillator 25 and the demodulators 26 and 27, produces a 90° phase difference between the two signals applied to the synchronous demodulators. The foregoing arrangement causes the demodulator 26 to be set to demodulate the 30 MHz carrier at reference phase (the I channel) and the demodulator 27 to demodulate the 30 MHz carrier at a quadrature phase (the Q channel) in relation to reference phase. The phase shifter 34 adjusts the detection angle of the demodulators 26, 27 by adjusting the phase of the local oscillator waveform used for synchronous demodulation. This adjustment of the phase shift within the processor 22 permits the desired 180° phase shift around the correlation loop.

The synchronously demodulated I and Q outputs from the demodulators 26 and 27 containing the correlation signal and the correlation noise are coupled to the low pass filters 28 and 29, respectively. The low pass filters 28 and 29 remove the higher frequency correlation noise from the outputs of demodulators 26 and 27, and pass only the lower frequency correlation signal to modulators 30 and 31. The low pass filters 28 and 29 have the relatively low frequency pass band appropriate for passing the correlation signal while permitting reasonable correlation loop stabilization times, and while reducing noise in the correlation signal.

The processor 22 is completed by the modulators 30, 31 by which the I and Q components of the correlation signal are remodulated in quadrature upon the 30 MHz carrier and then combined in a power combining, 180° hybrid junction 37 to form a single correlation signal containing phase and magnitude information suitable for use as a weight. The "weight" is supplied to the output terminal 65 of the processor.

The modulators 30, 31 and associated elements form the weight as follows. One input of the I modulator 30 is coupled to the output of the low pass filter 28, while the other input is coupled in a 180° path through the 3 db directional coupler 33 to the local oscillator 25. Similarly, one input of the Q demodulator 31 is coupled to the output of the low pass filter 29, while the other input is coupled in a 90° path through the 3 db directional coupler 33 to the local oscillator 25. By means of these connections, the I and Q components of the correlation signal are modulated in 30 and 31 upon quadrature related 30 MHz carriers. The outputs from the modulators 30 and 31 are then combined in the power combining, 180° hybrid junction 37 to form a single correlation weight at the processor output terminal (65) as noted above.

The correlation weight modulated on a 30 MHz carrier and still retaining the correlation data is coupled via terminal 65 to one input of the weighting multiplier 20. The other input of the weighting multiplier 20 is coupled via the coupler 18 to the auxiliary receiver for application of the interference. The weighting multiplier multiplies the interference by the correlation weight to obtain weighted interference for application to the correlation summer 15. After the correlation loop has had ample time to respond, the interference components at the two inputs to the summer 15 are at the same frequency, have substantially equal magnitudes and substantially opposite phases. Under the assumption that the interference and the desired signal are uncorrelated, the interference component in the output of the summer 15 is optimally cancelled.

The arrangement illustrated in FIG. 1 incorporates a manual phase shifter 34 together with a test signal generator 24 and the signal injection couplers 13 and 16 for purposes of compensating for phase errors in the cancellation feedback loop. The correlation feedback loop is a closed path which, starting arbitrarily from terminal 40 (FIG. 1), continues always in the direction of signal transmission, through the phase adjusted adaptive weight processor 22, terminal 65, weighting multiplier 20, cancellation summer 15, coupler 23, correlation mixer 21, and back to terminal 40. Ideally, any signal traversing this correlation feedback loop should experience a phase shift of 180°. This phase shift is desirable in that it insures maximum stability of the correlation loop and as a consequence of improved loop operation, insures greatest accuracy in the cancellation performed in the cancellation summer 15.

In the manual phase alignment process of FIG. 1, the test signal generator 24 (at 1300 MHz) is turned on to provide a signal at the upper input ports of the correlation mixer 21, the weight multiplier 20 and the cancellation summer 15 to activate the correlation loop. Next, the correlation loop is broken at terminal 40 and a 30 MHz test signal is injected into the processor 22. At the same time, the signal entering the terminal 40 from the correlation mixer 21 after traversal of the loop is intercepted. The phase difference between this 30 MHz test signal and that intercepted is then measured and the manual phase shifter 34 is adjusted until the measured phase difference is 180°. This process is ordinarily carried out in the factory and must be repeated whenever changes occur in the correlation cancellation loop.

In accordance with the invention, the improved electronic phase adjusting adaptive weight processor illustrated in FIG. 2 may be substituted for the manually phase adjusted adaptive weight processor provided in FIG. 1. For convenience, elements appearing in both figures bear the same reference numerals although they may be subject to some degree of mutualdifferentiation. The output of the correlation mixer 21 (see FIG. 1) is coupled to the input terminal 40 of the electronic phase adjusting weight processor 22' illustrated in FIG. 2.

The electronic phase adjusting adaptive weight processor 22' includes elements contained in processor 22 and additional elements required for electronic phase adjustment. More particularly, the processor 22' includes the demodulators 26, 27, the low pass filters 28, 29, local oscillator 25, modulators 30, 31 and one (32) of the two (32, 33) directional couplers, all of which are also present in the processor 22 of FIG. 1. In addition, the processor 22' includes an electronically controlled coordinate rotation matrix (41-54), (shown interconnected between the output terminals of the low pass filters 28, 29 and the input terminals of the amplifiers 55-56 (at the input terminals of the modulators 30, 31)), and a phase error correction network (57-64), responsive during the phase adjustment procedure for operating the electronically controlled coordinate rotation matrix (41-54).

The external connections to the processor 22' and the internal connections traced to the output of the I, Q filters 28, 29 are as before. The input terminal 40 of the processor 22' is coupled externally to the correlation mixer 21, in which the correlation signal and correlation noise appear. The input terminal 40 is coupled internally via a suitably terminated rf connection to one input terminal of the I demodulator 26 and to one input terminal of the Q demodulator 27. Local oscillations from the local oscillator 25 are coupled via hybrid 32, which produces a 30 MHz output at reference and quadrature phase to the other input terminals of the I and Q demodulators 26 and 27, respectively. The demodulators 26 and 27 synchronously detect the output of the correlation mixer 21, producing the correlation signal at base band at reference (I) and quadrature (Q) phase. The correlation noise is also present in the mixer output. The I and Q demodulator outputs are then filtered in the low pass filters 28, 29 to select the correlation signal and reject the correlation noise. The correlation signal (separated into I and Q components) is now in a form suitable for application to the phase rotation matrix 41-54.

The coordinate rotation matrix 41-54 adjusts the phase of the correlation signal to an angle "$\theta$" determined to be optimum for interference cancellation by the phase error correction network (57-64). The phase may be adjusted by the coordinate rotation matrix over a full four-quadrants, repeating as necessary at the $2\pi$ phase position for continuity. The coordinate rotation matrix produces the phase rotation by processing the in phase (I) and quadrature (Q) components of the correlation signal at the output of the low pass filters 28, 29. These components may be represented as follows:

$$I = M \cos \alpha$$

$$Q = M \sin \alpha$$

where M is the magnitude, and $\alpha$ the angle of the correlation signal.

The coordinate rotation matrix comprises an eightfold plurality of gates 43-50, aided by a pair of unity-gain inverters 41, 42, which supply the I and Q components of the correlation signal at selectable polarities to four inputs of a four-fold plurality of multiplying digital to analog converters 51-54.

The gates 43 through 50 and the inverters 41, 42 of the coordinate rotation matrix are interconnected as follows. Each gate (of 43-50) has an input connection, a control signal connection, and an output connection. The filtered reference (I) phase correlation signal from low pass filter 28 is connected uninverted (I) to the input connections of gate 43 and gate 45. The filtered reference (I) phase correlation signal from low pass filter 28 is also coupled via the inverter 41, where it is inverted (−I), to the input connections of gate 44 and gate 46. The filtered quadrature (Q) phase correlation signal from low pass filter 29 is coupled uninverted (Q) to the input connections of gate 47 and gate 49 and it is also coupled via the inverter 42, where it is inverted (−Q), to the input connections of gate 48 and gate 50.

The outputs of the gates 43-50 of the coordinate rotation matrix are coupled to a first signal input of each of the four multiplying digital to analog converters (51-54). The outputs of gate 43 and gate 44 are coupled to one input of the MDA converter 51 which is associated with production of the quantity "I cos $\theta$". The outputs of gate 45 and gate 46 are coupled to one input of the MDA converter 52 which is associated with production of the quantity "I sin $\theta$". The outputs of gate 47 and gate 48 are coupled to one input of the MDA converter 53 which is associated with production of the quantity "—Q sin θ". The outputs of gate 49 and gate 50 are coupled to one input of the MDA converter 54 which is associated with the production of the quantity Q cos θ. Control signals for opening or closing each of the gates (43–50) are provided by means of single connections to switch control logic 64 of the phase error correction network. The switch control logic provides control signals to the gates (43–50) in accordance with the coordinate rotation states illustrated in FIG. 3.

The phase rotation matrix is completed by the fourfold plurality of multiplying digital to analog converters 51–54 and the phase error control network which controls phase angle selection.

The multiplying digital to analog converters 51–54 of the coordinate rotation matrix individually form the quantities named and are collectively interconnected to combine these quantities to provide a rotation of the correlation signal by the angle theta ($\theta$). Each MDA converter has an analog signal input connection, a digital data input connection, and an output connection from which the product of the two input signals is obtained. In addition, each MDA converter has a clocking connection to clock control 61 of the phase error correction network.

The MDA converters 51–54 are interconnected as follows. The analog signal input of each converter is connected as previously recited via the gates 43–50 to an I or Q signal of suitable polarity. The digital data input of each of the MDA converters 51–54 is coupled to a sin/cos ROM (Read Only Memory) 63 in the phase error control network. The sin/cos ROM 63 has connections to each of the MDA converters so that upon selection of the angle $\theta$ by other portions of the phase error control network, the cosine of the selected angle $\theta$ is coupled to the digital data input of the MDA converter 51 and the digital data input of the MDA converter 54. The sine of the selected angle $\theta$ is coupled to the digital data inputs of MDA converter 52 and MDA converter 53. The output terminal of the MDA converter 51 providing the quantity I cos θ and the output terminal of MDA converter 53 providing the quantity —Q sin θ are connected together at the input to the buffer amplifier 55 to form a quantity I' representing the I coordinate of the correlation signal rotated by the angle $\theta$.

$$I' = I \cos \theta - Q \sin \theta$$

which by substitution for I and Q equals $$I' = (M \cos \alpha)(\cos \theta) - (M \sin \alpha)(\sin \theta)$$

This is a well-know trigonometric identity which may be expressed as:

$$I' = M \cos (\alpha + \theta)$$

which represents the (I) coordinate of the correlation signal additionally rotated by the angle $\theta$.

The output terminal of the MDA converter 52 providing the quantity I sin θ and the output terminal of the MDA converter 54 providing the quantity Q cos θ are connected together at the input to the buffer amplifier 56 to form a quantity Q' representing the Q coordinate of the correlation signal rotated by the angle $\theta$.

$$Q' = I \sin \theta + Q \cos \theta,$$

which by substitution for I and Q equals $$Q' = m \sin \alpha \cos \theta + M \cos \alpha \sin \theta$$

This is an equally well-known trigonometric identity which may be re-expressed as:

$$Q' = M \sin (\alpha + \theta)$$

which represents the (Q) coordinate of the correlation signal additionally rotated by the angle $\theta$.

The phase rotated I' and Q' components of the correlation signal available at the outputs of the buffer amplifiers 55 and 56 are coupled respectively to the inputs of the modulators 30, 31 for modulating the quadraturely related components of the 30 MHz carrier derived via the hybrid 32 from the local oscillator 25. The modulated outputs of the modulators 30, 31 are then combined in the power combining junction 37 to form a single correlation signal containing phase and magnitude information suitable for use as a weight. This weight appears at the output terminal 65 of the processor for further use.

The phase error control network performs the control functions in the side lobe canceller necessary to creating a phase correction or "alignment" state and the control functions necessary to sustaining, during a "hold" state (when phase correction is not taking place), the phase angle settings determined to be correct during the most recent alignment state.

The phase error control network, which includes the elements 57–64 assumes an "alignment" or "hold" state in response to the operation of a switch, not illustrated, coupled to the align/hold terminal 39, the terminal 39 being in turn coupled to the input of the switch control logic illustrated in FIG. 2 as the block 64, contained within the phase control network. The switch coupled to the terminal 39 may be operated automatically in response to the passage of time or in response to re-energization of the equipment or by operator choice.

During the "alignment" state, the phase error control network introduces a phase calibrating dc signal into the input of the I channel amplifier (55), senses an error signal at the output of the Q channel amplifier (56) attributable to the calibrating signal; and generates a sequence of control signals for the gates 43–50 and MDA converters 51–54 of the coordinate rotation matrix, the counting sequence being controlled (counting up or down) to cause the coordinate rotation settings to increment toward zero error signal. The test signal generator 24 is turned on in response to an "alignment" input at terminal 39, normally by operation of the switch control logic 64, mentioned above.

During the "hold" state, which is in response to a "hold" input at terminal 39, the phase error correction network suspends the introduction of the calibrating signal, and generates a plurality of logic states for sustaining the settings for the gates 43–50, which control the sign selection of the products formed in the converters 51, 54 as a function of quadrant of the angle $\theta$. The MDA converters 51, 54 have digital data registers which store the sin $\theta$; cos $\theta$ magnitudes supplied from a sin/cos ROM, illustrated in FIG. 2 as the block 63, contained within the phase error control network.

The circuitry of the phase error control network, which performs the functions noted above, is partioned into the functional blocks 57–64. The switch control logic 64, acting in response to the state setting at the align/hold terminal 39, provides control of the control signals supplied by the phase error control network 57–64 to the coordinate rotation matrix 41–54 and to the test signal generator 24 of the side lobe canceller, as well as control of the other functional blocks within the phase error control network.

The switch control logic 64 contains the necessary logic for establishing the states of the quadrant sign selection gates 43–50, a control connection for application of the phase calibrating dc signal to the input of the I channel amplifier 55, and a control connection for application of a control signal to the test signal generator 24. The states of the gates 43–50, 59 during the align and hold states are illustrated in FIG. 3.

The phase calibrating dc signal, active during the alignment state, is produced in the phase error control network 57–64 and introduced into the side lobe canceller loop at the input of the I channel amplifier 55, as noted above. The calibrating dc signal is a voltage produced by the circuit including the elements 58, 59 and 38. The terminal 38 is a source of reference voltage ($V_R$) which provides a voltage suitable for phase calibration purposes at the input to the operational amplifier 55. The gate 59 is serially connected with resistor 58 between the terminal 38 and the signal input to the amplifier 55. Gate 59 is a solid state switch, which is closed during the alignment state (as in FIG. 3) and open during the hold state. The gate 59 has a control connection to the switch control logic 64, whose output state is responsive to the condition at the align/hold terminal 39.

During the alignment state, the control logic 64 also applies a logical control signal to close gates 43, 44, 47 and 48, which supply the $\pm I$ and the $\pm Q$ signals to the converters 51, 53. The settings for the other gates 45, 46, 49 and 50, which are determined by the quadrant settings, will be treated hereinafter. The states of the gates 43–50—during the alignment state, are illustrated in FIG. 3. Thus, the converters 51 and 53 are held in a zero output state during the alignment state to allow the introduction of the dc calibrating quantity into the correlation canceller loop.

The phase error sensed during the alignment state at the output of the Q channel amplifier 56 is coupled to the error detector 57 within the phase error control network. The input coupled to the error detector 57 is the quantity Q' graphed against loop phase shift $\phi$ in FIG. 4:

$$Q' = \frac{\sin \phi}{\cos \phi - 1}$$

The quantity Q' goes from high positive values when the loop phase shift $\phi$ is near zero, approaches zero when $\phi$ is 180° (the desired value), and goes to a high negative value when $\phi$ approaches 360°. The error detector block 57 contains an amplifier which senses only the polarity of the input signal. The output of the error detector, which is coupled to the direction control input of the counter 60, is a binary digital state, providing a plus signal to cause the counter 60 to count up and a negative signal to cause the counter to count down at a counting rate established by the clock in the clock control block 61.

The sin/cos magnitudes for $\theta$ which are coupled to MDA converters 51–54, are derived from the sin/cos ROM 63 of the phase error control network in cooperation with the bidirectional counter 60, the clock control block 61, and the (digital, binary) true/complement block 62 under the control of switch control logic 64.

During the alignment state, the trigonometric functions are adjusted for coordinate rotation as necessary to bring the detected phase error close to zero (or the loop phase shift $\phi$ close to 180°). In the actual embodiment, a practical null condition may at all times produce a non-zero output state at the error detector 57, causing the counter 60 to alternate between a single upward count and a single downward count, at half the clocking rate. The MDA converters 51–54, each have a memory register for eight bits of trigonometric magnitude data supplied thereto from the ROM 63 corresponding to the appropriate sine or cosine quantity for the angle $\theta$. In the alignment state, the counter 60 counts until the error detector is nulled, the angle $\theta$ being proportional to the null count.

The foregoing coordinate rotation is achieved under the control of the switch control logic 64, which activates the clock control block 61, the bidirectional counter 60, the true/complement block 62, and the sin/cos ROM 63 in cooperation with the other blocks in the phase error control network.

In the hold state, under the control of the switch control logic 64, the MDA converter registers retain the stored trigonometric magnitudes corresponding to the angle $\theta$ until the next alignment state and the bidirectional counter, clock, and the true/complement blocks (60, 61, 62) are held in inactive states.

The blocks 60–64 determine the coordinate rotation angle $\theta$ required to adjust the loop phase shift angle $\phi$ to 180° and generate the sine and cosine functions of $\theta$ in the following manner. The clock control block 61 contains a relatively low frequency clocking oscillator (2 KHz) which is activated in response to a logical high at the corresponding output of the switch control logic 64. (The logical high state is in turn responsive to an "align" state at the align/hold input 39.) For each increment or decrement of counter 60, the clock control must also command the true/complement function 62 to successively produce both the true and complementary states of the low order bits of counter 60 so that the sin/cos ROM 63 may provide both sine and cosine functions in succession to be stored in MDA converters 51–54.

The bidirectional counter 60 counts in the forward direction (up) with a positive signal on its direction input terminal, and in the reverse direction (down) with a negative signal at this terminal. The counting rate is controlled by the clock rate as noted. This bidirectional counter is typically a 10 bit (1024 state) counter, with the two stages corresponding to the two most significant bits being coupled to an input of the switch control logic 64, which contains logic for controlling the quadrant sign selection gates 43–50. Eight stages of the bidirectional counter 60, corresponding to the eight least significant bits, are coupled to the true/complement block 62, which is instrumental in producing a sine or cosine value for each angle $\theta$ looked up in the ROM 63.

The true/complement block 62 (assuming a first quadrant indication from 64) and an error requiring a positive count, acts in response to one half of a clock cycle to produce an increasing output count, counting from zero. This causes the true state of the low order bits to be applied to the ROM 63 to produce the sine function. The block 62 (assuming a first quadrant indication from 64) is then commanded to the complementary state, which causes the sin/cos ROM response to the other half clock cycle to produce an output count corresponding to a reverse count from 256, which produces a cosine function on the algorithmic basis that:

$$\sin\theta = \cos(90-\theta)$$

where $(90-\theta)$ is the complement of $\theta$ within the quadrant.

The sin/cos ROM 63 is a digital input-digital output device which has typically $2^8$ bit resolution or 256 counts for the stored function. The device stores the equivalent of a sine function at each of $2^8$ increments in one quadrant. Thus, as the input angle increments from zero to 256 counts, each count corresponding to approximately a third of a degree, the sine output function is incremented from zero upward. In the output format of the ROM 63, the sine function varies from zero to 256 counts. This is scaled to correspond to the conventional sine quantity, which varies from 0–1. The sin $\theta$ magnitude is then coupled via an 8 bit bus to the sin $\theta$ inputs of MDA converters 52 and 53 for storage in their includes registers.

The cosine function corresponding to the input count (which defines the angle $\theta$, whose cosine function is now sought) is produced as follows. The true/complement block 62 (still assuming a first quadrant indication from 64), acts during each cycle of the clock to produce a new number, which is a complement of the count obtained from the counter 60. The complemented count is coupled as an input to the sin/cos ROM and a cosine function is derived which varies, from 256 to zero counts. The conventional cosine quantity, which varies from one to zero is obtained through scaling. The cos $\theta$ magnitude is then coupled via an 8 bit bus to the inputs of the MDA converters 51 and 54 for storage in their registers.

The production of the sine and cosine values, for the first quadrant of $\theta$, has been described assuming a "true" state for the true/complement block 62 for the sine function and a "complemented" state for the cosine. The first quadrant sine look-up function is converted to a full four quadrant sine/cosine function by operation of the switch control logic 64 responding to the two most significant bits from the bidirectional counter. The logic in block 64 deals with the correct magnitudes of the trigonometric functions in its control of the true/complement block 62 and the correct signs of the functions in its control over the gates 43–50.

In dealing with the correct magnitude of the trigonometric functions in all four quadrants, the switch control logic 64 responds to bit 9. When bit 9 is low, block 62 is true for the sine function and in a complemented state for the cosine function. This occurs in the first and third quadrants. In the second and fourth quadrants, bit 9 is high causing the block 62 to be in the complemented state for the sine function and true for the cosine function. This corresponds to the observed regularity of the sine function in which the sign magnitude increases in the first quadrant, decreases in the second quadrant, increases in the third quadrant and decreases in the fourth quadrant. Correspondingly, the cosine decreases in the first quadrant and third quadrant and increases in the second and the fourth quadrants. In each of the four quadrants, the sine increments in a sense opposite to the cosine. Thus logic 64 responding to bit "9" may be used to define the sense of incrementing the dependent variable in the ROM for both sine and cosine functions for all four quadrants.

In dealing with the correct signs of the trigonometric functions in all four quadrants, the switch control logic responds to most significant bits 9 and 10 in its control of gates 43 through 50. Gates 45, 46, 47 and 48 control the effect of the quadrant selection upon the sign of the sine function, gates 45 and 48 being associated with a positive sine and gates 46 and 47 being associated with a negative sine. The sine is positive when bit 10 is low in the first and second quadrants. The sine is negative when bit 10 is high in the third and fourth quadrants. Thus, in the first and second quadrants, when bit 10 is low, gates 45 and 48 are open and gates 46 and 47 are closed, producing a positive polarity for the sine function at the inputs to the MDA converters 52 and 53. Similarly, in the third and fourth quadrants when bit 10 is high, gates 46 and 47 are open and gates 45 and 48 are closed, producing a negative polarity for the sine function at the input to the MDA converters 52 and 53.

Gates 43, 44, 49 and 50 control the effect of the quadrant upon the sign of the cosine function, gates 43 and 49 being associated with a positive sign and gates 44 and 50 being associated with a negative sign. The cosine is positive when bit 9 is the same as bit 10, which occurs in the first and fourth quadrants, and negative when bit 9 is different from bit 10 in the second and third quadrants. Thus, in the first and fourth quadrants when bit 9 equals bit 10, gates 43 and 49 are open and gates 44 and 50 are closed, producing a positive polarity for the cosine function at the input to the MDA converters 51 and 54. Similarly, in the second and third quadrants, when bit 9 is different from bit 10, gates 44 and 50 are open and gates 43 and 49 are closed.

Summarizing, operation of the coordinate rotation matrix to effect correction of the phase shift around the correlation canceller loop occurs in the following manner. With the switch 39 set to the alignment state, the test signal generator 24 (at 1300 MHz) is turned on, generating an rf signal which activates the feedback loop previously described (the phase adjusted adaptive weight processor and elements 20, 15, 23, 21). In this state, the outputs of the MDA converters 51, 53 are off and a fixed I reference is substituted at the input to the I amplifier 55. The gates 45, 46, 49 and 50 and the MDA converters 52 and 54 are in a dynamic output state which responds to successive counts of the bidirectional counter 60, via the SCL 64 and the sin/cos ROM 63, respectively. The counter 60 continues to count toward a null condition until the error detector 57 senses a null condition. When the null is sensed, the quantity Q', which has been stripped from the test signal carrier, appears at the output of the amplifier 56 at a near zero condition, signifying that the phase shift $\phi$ around the loop is 180°, and at the correct value.

The phase alignment process may now be treated in greater detail. The alignment reference signal (with test signal generator 24 on) is fed from gate 59 through resistor 58, I amplifier 55, modulator 30, hybrid junction 37, to output terminal 65. This signal is subjected to phase shift through the rest of the system (weighting multiplier 20, cancellation summer 15, coupler 23, correlation mixer 27, and cabling propagation delays) and returns to the adaptive processor terminal 40. The terminal 40 return signal is then split through hybrid junction 36, demodulated with quadrature-related demodulators 26 and 27 and filtered by low pass filters 28 and 29, respectively. The output 28 is fed through either gate 45 or inverter 41 and gate 46, through multiplying digital to analog converter 52 to the input of summing Q amplifier 56. The output of 29 is similarly fed through either gate 49 or inverter 42 and gate 50, through multiplying D/A converter 54 to the input of summing Q amplifier 56.

The outputs of the low-pass filters 28, 29 represent the cosine and sine terms of the return signal and the trigonometrically-scaled multiplying D/A converters with their input polarity selection and output summation represent the base-band coordinate phase shift. The amplifier 56 output thus represents one of the terms of the output signal subjected to the sum of an analog phase shift through the rf circuits and a digital phase shift at base band. Thus, by adjusting the digital phase shift, the total loop phase shift can be controlled. The signal from amplifier 56 is modulated by modulator 31 in quadrature with modulator 30 and the two outputs are combined in hybrid junction 37 to form a modified signal at 65.

The resulting combined signal feeding around the loop produces a signal at the output of 56 which is the ratio of the sine of the combined angles $\phi$ to the difference between the cosine of this angle ($\phi$) and unity $$Q' = \frac{\sin \phi}{\cos \phi - 1}$$

That this zero's at 180° phase shift ($\phi$) may be seen from inspection. At 180° the numerator is zero ($\sin 180° = 0$) and the donominator is negative two ($\cos 180° - 1 = -2$). This produces an error signal with a slope which does not change direction throughout the full 360° rotation (except for a discontinuity from "minus infinity" to "plus infinity" at a point 180° from the desired single, stable null). This is in contrast to a conventional servo system which might have a sinusoidal error pattern over the full 360°.

Once the error has stabilized near zero, the loop may be restored to the normal "operate" or "hold" state by turning off the align function at 39. Before turn-off, the bidirectional counter 60 has reached the count defining the correct phase shift (the angle $\theta$). The SCL 64, responding to the count stored in the counter, determines the trigonometric sign(s) appropriate for that phase shift for selection of the states of gates 45, 46, 49, 50. The sin/cos ROM 63 also responding via 62 to the count stored in the counter determines the trigonometric magnitudes appropriate for the correct phase shift and transfers this data to the registers of the converters 51 to 54. Operation of 39 to hold, turns off test signal generator 24, disconnects the reference 38 and releases gates 43, 44, 47 and 48 to assume the polarities indicated by the SCL as appropriate for the correct phase shift. The phase alignment is complete and the system is now ready for normal operation.

A significant feature of the present embodiment, not present in the conventional alignment process, is that the alignment phase shifting is done through the MDA's converters at base band, and is done by a digitally controlled rotation of the correlation coordinates.

A second embodiment of the invention is illustrated with primary reference to FIG. 5. In this second embodiment, an electronic digital phase shifter of FIG. 5 is incorporated in the FIG. 1 arrangement in the path between the local oscillator 25 and the directional coupler 32. This electronic digital phase shifter automatically performs the same function as the manually phase adjusted adaptive weight processor 34, but operates under the control of a phase error control network similar to the network 57-64 illustrated in FIG. 2. Effecting the phase shift by operating upon the local oscillator output as in this second embodiment has the same net effect upon loop performance as using the base band coordinate rotation matrix of the first embodiment.

The second embodiment may be described with reference to FIGS. 1, 2 and 5 as follows. In FIG. 1, the manual phase shifter is shown connected between the terminals 66 and 67, terminal 66 being coupled via a branching junction to the local oscillator 25, and the terminal 67 coupled via the coupler 32 to demodulators 26 and 27. The digital phase shifter of FIG. 5 has its input terminal 71 coupled to the terminal 66 of FIG. 1 and its output terminal 72 coupled to the terminal 67 of FIG. 1.

The digital phase shifter of the second embodiment is subject to control by the phase error control network 57-64 of FIG. 2 which is also a part of the second embodiment and interconnected as follows. The elements 58, 59, 38 and amplifier 55 illustrated in FIG. 2 are present in the second embodiment and form the means to inject the reference signal from the phase error control network 57-64 into the input of the modulator 30. Similarly, the error detector 57 and the amplifier 56 are present for deriving the error signal appearing at the input to the modulator 31 of FIG. 1. The phase error control network 57-64 of FIG. 2 appears in the second embodiment unchanged except for the number of connections made due to the smaller number of gates and the smaller number of MDA converters. The logical design of the network 57-64 is thus the same in both embodiments.

Returning now to FIG. 5, the digital phase shifter is seen to comprise the elements 71-86. As earlier noted, the 30 MHz oscillator waveform is coupled from pin 66 (FIG. 1) to the input terminal 71 (FIG. 5), and the digitally phase shifted oscillator output waveform is coupled from pin 72 (FIG. 5) to the terminal 67 (FIG. 1) for application to demodulators 26 and 27 (FIG. 1). In addition, a further terminal 86 is provided for application of a standard voltage reference ($V_R$) to the phase shifter. The reference voltage coupled to the terminal 86 is applied uninverted ($+V$) to the inputs of the gates 75, 77 and applied via the inverter 74 in an inverted state ($-V$) to the inputs of the gates 76, 78. As described in connection with the first embodiment, the gates 75-78 are subjected to control from the switch control logic 64 (FIG. 2) of the phase error control network for quadrant selection. The outputs of the gates 75 and 76 are coupled to the first (analog) input terminal of the multiplying D to A converter 79 (bearing the label "cos $\theta$"). The outputs of gates 77 and 78 are coupled to the first input terminal of the MDA converter 80 (bearing the label "sin $\theta$"). The appropriate sine/cosine magnitude is applied from the ROM 63 (FIG. 2) to the second digital input of the converters 79, 80. The converters 79, 80 are clocked from the clock 61 (FIG. 2). The product output of the converter 79 is coupled via an operational amplifier 81 to the (I') modulator 82. The product output of the converter 80 is coupled via the operational amplifier 84 to the (Q') modulator 85. The local oscillator output from terminal 71 is coupled into one port of the 90° hybrid 83 which produces two outputs which are in quadrature, one output by definition at reference phase is coupled to the modulator 85. The output of the one modulator 82 on a 30 MHz carrier at reference phase is accordingly digitally adjusted in proportion to the cosine θ function. The output of the other modulator 85 on the same carrier but at quadrature phase is accordingly digitally adjusted in proportion to the sine θ function.

The outputs of the modulators 82 and 85 are combined in the junction 73 to form a single waveform on the 30 MHz carrier phase shifted by the angle θ from the original. The output waveform appearing at the junction 73 is coupled to the output pin 72.

The circuit elements of the blocks illustrated in the figures are generally conventionally available integrated circuits, the counter 60 being a 10-bit bidirectional counter available from several manufacturers (a type which continues the count through a full or empty register). If the requirements for resolution are greater, a larger counter could be employed. The multiplying digital to analog converters illustrated in the several figures may be the type AD752A available from Analog Devices, Inc. having 8-bit digital input ports and 8-bit storage registers. The switches used in the quadrant selection gates may be dual single pole single throw FET switches of the type DG181 from Siliconix Inc. The operational amplifiers of which four are required in the first embodiment are of the sort available from several manufacturers.

The digitally controlled phase modulator networks (FIG. 2; 41–54; FIG. 5) herein disclosed are cyclical in that the phase shift readily continues through 0° as the phase shift is being reduced (producing sine and cosine values of θ which correctly represent the quadrant that was exited and the quadrant that was newly entered). This property is also present as the phase shift is increased through 360°. The modulator design not only insures that a null can be obtained in the side lobe canceller, but the use of a bidirectional counter and choice of an error function provides that correction will take place by a correction of less than 180°, to minimize the loop stabilization time.

The injection of the correlation test signal into the I modulator, while opening the I loop, and allowing the Q loop to function, and the detection of the phase null at the input to the Q modulator by an error detector whose output determines the counting direction, are the means for deriving the desired unambiguous null.

The phase modulation is digital, providing flexibility, stability and precision. In a side lobe canceller, one implication of these properties is that the phase delay is digitally registered, and will hold the established setting indefinitely.

The phase shift provided by the modulator is independent of frequency, and is accomplished with no change in signal delay. This insures full band stability in a side lobe canceller.

Switches are normally described as open when non-conducting, and closed when conducting. The gates, herein described, are in fact switches. The foregoing description uses language conventional to gate operation: a gate when "open" is conducting, and when "closed" is non-conducting.

What is claimed as new and desired to be secured by Letters Patent of the United States is:

1. In a reception system having a main directional antenna and an auxiliary, less directional antenna, an interference cancellation phase coherent correlation cancellation loop, comprising:

A. means to generate an auxiliary test signal on a carrier as virtual interference for loop phase adjustment, said generating means having as On-Off control input and an output, B. a cancellation summer having a first input, a second input and an output,
   (1) means coupling the main return containing interference on a carrier in the operate state and the output of said test signal generating means in the alignment state to said first summer input,
   (2) means coupling a weighted auxiliary signal containing interference on a carrier into operate state and the output of said signal generating means in the alignment state to said second summer input for interference cancellation,
   (3) said summer output providing the main signal and an interference residue on a carrier, C. a correlation mixer having a first input, a second input and an output,
   (1) means coupling a part of said summer output containing said interference residue to said first mixer input,
   (2) means coupling said auxiliary signal containing interference in the operate state and the output of said test signal generating means in the alignment state to said second mixer input, and
   (3) said mixer output providing a first complex correlation vector modulated on a carrier and resulting from the correlation of the interference in said two mixer inputs for use as a complex weight for interference cancellation;

D. a phase adjusting adaptive weight processor, comprising:
   (1) a stable oscillator having a frequency equal to said correlation carrier and producing two quadraturely related components,
   (2) digitally adjustable phase shifting means comprising a pair of synchronous demodulators coupled to the output of said correlation mixer and to said stable oscillator to derive two quadrature related correlation vector coordinates at base band, digitally phase shifted by an angle θ,
   (3) a first and a second modulator coupled to said stable oscillator to modulate said phase coupled correlation coordinates, respectively, on the first and second of two quadrature related components of a carrier, coherent with said correlation carrier, and
   (4) a digital phase error control network coupled to said digitally adjustable phase shifting means for adjusting said angle θ, comprising
      (i) means to decouple one correlation component (e.g. I) at base band in said adaptive weight processor prior to application to said first modulator in the alignment state, and substitute a reference value therefor,
      (ii) means coupled to the input of said second modulator to derive an error quantity corresponding to the other correlation component (e.g. Q') at base band resulting from application of said reference value state after the correlation loop has stabilized in the alignment mode, said error quantity approaching zero at a correlation cancellation loop phase shift of approximately 180°, and
      (iii) means responsive to said error quantity to digitally command phase shift of said base band correlation coordinates to the angle θ, at which said error quantity is nulled in the alignment state and said loop phase shift is set to approximately 180° in the alignment state for operation, (5) means to combine the outputs of said modulators to form a second correlation vector, phase shifted by said angle $\theta$ in respect to said first correlation vector, and modulated on said carrier coherent with said correlation carrier, E. a weighting multiplier having a first input, a second input, and an output, (1) means coupling said carrier borne second correlation vector to said first multiplier input, (2) means coupling said auxiliary signal containing interference in the operate state and the output of said test generating means in the alignment state to said second multiplier input, and (3) means coupling the product formed in said multiplier to said second input of said cancellation summer to complete the correlation cancellation loop.

2. The combination set forth in claim 1 wherein said means to derive an error quantity $Q'$ derives the quantity:

$$Q' = \frac{\sin \phi}{\cos \phi - 1}$$

where $\phi$ is the loop phase shift.

3. The combination set forth in claim 2 wherein said correlation vector phase shifting means comprises a coordinate rotation matrix operating on said correlation coordinates (I, Q) after demodulation to base band, where $I = M \cos \alpha$ $Q = M \sin \alpha$ where $\alpha$ is the phase shift and M is the magnitude of the correlation coordinate in traversing the correlation loop, said matrix including means to multiply said I and Q correlation coordinates by stored digital trigonometric quantities in quadrant dictated polarities to obtain the phase shifted correlation coordinate (I'), where $I' = I \cos \theta - Q \sin \theta$ $= (M \cos \alpha)(\cos \theta) - (M \sin \alpha)(\sin \theta)$ $I' = M \cos(\alpha + \theta)$ and to obtain the phase shifted correlation coordinate (Q'), where $Q' = I \sin \theta + Q \cos \theta$ $= (M \sin \alpha)(\cos \theta) + (M \cos \alpha)(\sin \theta)$ $Q' = M \sin(\alpha + \theta)$ the angle $\theta$ being adjusted by said error control network until $(\alpha + \theta) = 180°$.

4. The combination set forth in claim 2 wherein said digitally adjustable correlation vector phase shifting means comprises a phase rotation matrix operating on said quadrature related oscillator components, coupled to said demodulators, said components ($I_o$, $Q_o$)

$I_o = \cos \alpha$ $Q_o = \sin \alpha$ where $\alpha$ is the phase of said in-phase oscillator component, said matrix including means to multiply said quadrature related oscillator components by stored digital trigonometric quantities in quadrant dictated polarities to obtain the phase shifted components ($I_o'$ and $Q_o'$) phase shifted by the angle $\theta$, where $I_o' = I_o \cos \theta - Q_o \sin \theta = \cos(\alpha + \theta)$ $Q_o' = I_o \sin \theta + Q_o \cos \theta = \sin(\alpha + \theta)$, means responsive to said phase shifted components $I_o'$ and $Q_o'$ to apply two quadrature related waveforms to said two demodulators, to produce the correlation coordinates (I', Q'), where $I' = M \cos(\phi)$ $Q' = M \sin(\phi)$ where M is the magnitude of the correlation coordinate, $\phi$ is the phase shift of the correlation coordinate traversing the correlation loop, the angle $\theta$ being adjusted by said error control network until $(\phi) = 180°$.

5. The combination set forth in claim 4 wherein said means responsive to said phase shifted components $I_o'$ and $Q_o'$ comprise:

a second pair of modulators, respectively operating on quadrature related oscillator components, means combining the output of said second pair of modulators, and hybrid means to which said recombined waveform is applied to form two quadrature components for application to said demodulators.

* * * * *